United States Patent [19]

Friedlander

[11] Patent Number: 4,649,082

[45] Date of Patent: Mar. 10, 1987

[54] RADIATION CURABLE COMPOSITIONS BASED ON RADIATION CURABLE ESTERS OF POLYFUNCTIONAL HYDROXYL-CONTAINING CARBOXYLIC ACIDS

[75] Inventor: Charles B. Friedlander, Glenshaw, Pa.

[73] Assignee: PPG Industries, Inc., Pittsburgh, Pa.

[21] Appl. No.: 709,147

[22] Filed: Mar. 7, 1985

[51] Int. Cl.[4] .......................... C08F 2/50; C08F 20/20; B32B 15/08; B32B 27/30

[52] U.S. Cl. .................................. 428/461; 428/462; 522/8; 522/102; 522/103; 522/121; 522/182; 522/183; 526/309; 526/320; 526/321; 560/128

[58] Field of Search ...................... 204/159.15, 159.23; 522/121, 106, 183, 182; 526/320, 321; 428/461, 462; 560/128

[56] References Cited

U.S. PATENT DOCUMENTS

| | | | |
|---|---|---|---|
| 3,182,041 | 5/1965 | Watkins et al. | 260/75 |
| 3,591,626 | 6/1971 | Aronoff et al. | 260/486 R |
| 3,631,154 | 12/1971 | Kawaguchi et al. | 260/76 |
| 3,645,984 | 2/1972 | Dowbenko et al. | 260/78.4 |
| 3,861,945 | 1/1975 | Hartzell et al. | 117/93.31 |
| 3,954,587 | 5/1976 | Kokawa | 204/181 |
| 4,005,244 | 1/1977 | Wismer | 522/107 |
| 4,046,577 | 9/1977 | Muzyczko | 522/104 |
| 4,058,443 | 11/1977 | Murata | 522/109 |
| 4,148,967 | 4/1979 | Satoh et al. | 428/416 |
| 4,153,778 | 5/1979 | Park | 528/80 |
| 4,171,977 | 10/1979 | Hasegawa | 522/106 |
| 4,183,836 | 1/1980 | Wolfe | 528/61 |
| 4,430,486 | 2/1984 | Chang | 525/453 |
| 4,497,932 | 2/1985 | Trovati | 524/839 |

*Primary Examiner*—John C. Bleutge
*Assistant Examiner*—A. H. Koeckert
*Attorney, Agent, or Firm*—Thomas M. Breininger

[57] ABSTRACT

Disclosed is an ungelled radiation curable resin which is a reaction product of (a) a polyfunctional hydroxyl-containing carboxylic acid having a molecular weight less than or equal to 1,000 and having a total functionality of equal to or greater than 3; (b) an organic hydroxyl-functional compound; and (c) an alpha, beta-ethylenically unsaturated carboxylic acid. Also disclosed is a radiation curable composition containing the radiation curable resin in combination with a polymer having a glass transition temperature equal to or higher than minus 17 degrees Celsius selected from an acrylic polymer and a polyester polymer.

The radiation curable resins are particularly useful for coatings over non-metallic substrates such as ABS plastics, etc., having an adherent, thin film of metal deposited by vacuum metallizing, sputtering, electroless deposition, electroplating, and the like.

27 Claims, No Drawings

RADIATION CURABLE COMPOSITIONS BASED ON RADIATION CURABLE ESTERS OF POLYFUNCTIONAL HYDROXYL-CONTAINING CARBOXYLIC ACIDS

BACKGROUND OF THE INVENTION

This invention is directed to radiation curable esters of polyfunctional hydroxyl-containing carboxylic acids for radiation curable compositions. The compositions are useful as coating compositions. They are particularly useful as radiation curable coating compositions over thin films of metal deposited on nonmetallic substrates.

It is known to apply a thin film of metal to a nonmetallic substrate to make a metallized substrate and to provide the metallized substrate with a protective coating. Such coated, metallized substrates are useful, for example, for articles such as containers and container caps for cosmetics. The substrates for such articles often are composed of heat sensitive materials such as heat sensitive plastics which can distort when exposed to elevated temperatures. It would be desirable to provide coatings for such metallized substrates that can be cured efficiently at temperatures below the temperatures at which such heat sensitive substrates distort. Moreover, it would be desirable to provide coatings for such substrates which are not only decorative, but also are highly adherent to the metallized substrate, are mar resistant, and are resistant to degradation by various solvents including both organic solvents and water. These and other objects will become apparent to one skilled in the art from the disclosure contained herein.

SUMMARY OF THE INVENTION

This invention is directed to ungelled resins which are esters of polyfunctional hydroxy-containing carboxylic acids having a molecular weight less than or equal to 1,000 and a combined hydroxyl and carboxyl functionality of equal to or greater than 3, particularly of di- or trialkylol carboxylic acids, especially dimethylol propionic acid, for compositions which can be cured by exposure to ionizing radiation and/or ultraviolet light. These esters of such low molecular weight polyfunctional hydroxyl-containing carboxylic acids are themselves curable by exposure to ionizing radiation and/or ultraviolet light (i.e., are radiation curable). The radiation curable esters are reaction products of: (a) a polyfunctional hydroxyl-containing carboxylic acid having a molecular weight less than or equal to 1,000 and having a combined hydroxyl and carboxyl functionality of equal to or greater than 3; (b) an organic hydroxyl-functional compound; and (c) an alpha,beta-ethylenically unsaturated carboxylic acid. The radiation curable reaction product ordinarily contains a mixture of radiation curable compounds, and for simplicity, will often be referred to herein as a "radiation curable resin".

This invention also is directed to a radiation curable composition containing the ungelled radiation curable esters of polyfunctional hydroxyl-contaning carboxylic acids (i.e., containing the radiation curable resin). When the ungelled radiation curable resin is utilized in a composition for application to a metallized substrate, the composition generally also contains a polymer having a glass transition temperature equal to or higher than minus 17 degrees Celsius (°C.) selected from the group consisting of an acrylic polymer, a polyester polymer, and a combination thereof.

This invention additionally is directed to a non-metallic substrate having thereon an adherent, film (or layer) of metal, typically a thin film of metal, coated with a radiation cured coating composition of the invention. The thin film of metal may be applied to the non-metallic substrate by any of the known techniques including, for example, vacuum deposition, sputtering, electroless deposition, and electrocoating.

DETAILED DESCRIPTION OF THE INVENTION

The ungelled radiation curable resin is a reaction product of components comprising: (a) a polyfunctional hydroxyl-containing carboxylic acid having a molecular weight of less than or equal to 1,000, preferably of less than or equal to 500, and most preferably of less than or equal to 300, and having a total functionality of equal to or greater than 3 (i.e., having a combined hydroxyl and carboxyl functionality of equal to or greater than 3), (b) an organic hydroxyl-functional compound, preferably essentially free of carboxyl functionality, and (c) an alpha,beta-ethylenically unsaturated carboxylic acid. Typically, the radiation curable resin has a double bond equivalent weight of from 100 to 1,000, preferably from 100 to 500. Although the molecular weight of a resin of the invention may vary depending on such factors as the molecular weights and the amounts of the compounds utilized to prepare the resin, typically a resin of the invention has a peak molecular weight, as determined by gel permeation chromatography using a polystyrene standard, of from 256 to 2,000. Typically a resin of the invention has an acid value of less than 10, preferably less than 5.

Organic hydroxyl-functional compounds for preparing the esters of the polyfunctional hydroxyl-containing carboxylic acids include mono hydroxyl functional compounds and poly hydroxyl functional compounds. It is preferred that the organic hydroxyl-functional compound have a hydroxyl functionality of at least 2. Examples of suitable compounds having a hydroxyl functionality of at least 2 include: (i) simple diols, triols, and higher hydric alcohols; (ii) polyester polyols typically having a peak molecular weight less than or equal to 1,000 as determined by gel permeation chromatography using a polystyrene standard; (iii) polyether polyols having a peak molecular weight of less than or equal to 1100 as determined by gel permeation chromatography using a polystyrene standard; and combinations thereof. Typically, the organic hydroxyl-functional compound is essentially free of carboxyl groups and usually is completely free of carboxyl groups.

Examples of the simple diols, triols and higher hydric alcohols include: ethylene glycol; propylene glycol; diethylene glycol; dipropylene glycol; butylene glycol; glycerol; pentaerythritol; sorbitol; 1,6-hexanediol; 1,4-cyclohexanediol; 1,4-cyclohexanedimethanol; 1,2-bis(-hydroxyethyl)cyclohexane; and 2,2-dimethyl-3-hydroxypropyl-2,2-dimethyl-3-hydroxypropionate.

Examples of the polyester polyols include the generally known polyester polyols prepared by conventional techniques utilizing polyhydric alcohols and polycarboxylic acids. Examples of suitable polyhydric alcohols include the simple diols, triols, and higher hydric alcohols set forth above. Examples of suitable polycarboxylic acids include: phthalic acid; isophthalic acid; terephthalic acid; trimellitic acid; tetrahydrophthalic acid;

hexahydrophthalic acid; tetrachlorophthalic acid; adipic acid; azelaic acid; sebacic acid; succinic acid; glutaric acid; malonic acid; pimelic acid; suberic acid; 2,2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid." In addition, certain substances which react in a manner similar to acids to form polyesters are also useful. Such substances include lactones such as caprolactone, propylolactone and methyl caprolactone, and hydroxyacids such as caproic acid and dimethylol propionic acid. If a triol or higher hydric alcohol is used, a monocarboxylic acid, such as acetic acid and benzoic acid may be used in the preparation of the polyester resin. Typically polyester polyols suitable for preparation of the radiation curable resins of the invention have a peak molecular weight less than or equal to 1,000 as determined by gel permeation chromatography using a polystyrene standard.

Examples of the polyether polyols include the generally known polyether polyols prepared by conventional techniques. Examples of polyether polyols include the poly(oxyalkylene)glycols prepared by the acid or base catalyzed addition of an alkylene oxide such as ethylene oxide and/or propylene oxide to initiator compounds such as ethylene glycol, propylene glycol, diethylene glycol, dipropylene glycol, trimethylolpropane, glycerol, pentaerythritol, sorbitol, sucrose and the like. Additional examples of polyether polyols include the generally known poly(oxytetramethylene)glycols prepared by the polymerization of tetrahydrofuran in the presence of Lewis acid catalysts such as boron trifluoride, tin (IV) chloride, antimony pentachloride, antimony trichloride, phosphorus pentafluoride, and sulfonyl chloride. Other examples of polyether polyols include the generally known reaction products of 1,2-epoxide-containing compounds with polyols such as those included in the description of simple diols, triols and higher hydric alcohols above. Typically polyether polyols suitable for preparation of the radiation curable resins of the invention have a peak molecular weight less than or equal to 1100 as determined by gel permeation chromatography using a polystyrene standard.

The polyfunctional hydroxyl-containing carboxylic acids suitable for preparation of a resin of the invention have a molecular weight of less than or equal to 1,000, preferably less than or equal to 500, and most preferably less than or equal to 300. The polyfunctional hydroxyl-containing carboxylic acids have a total functionality of equal to or greater than 3, i.e., the combined hydroxyl and carboxyl functionality is equal to or greater than 3. Typically the polyfunctional hydroxyl-containing carboxylic acids are di- or trialkylol carboxylic acids and usually are di- or trimethylol carboxylic acids. Examples of the polyfunctional hydroxyl-containing carboxylic acids include: 2,2-dimethylol propionic acid; 2,2-dimethylol acetic acid; 2,2-dimethylol pentanoic acid; 2,2-dimethylol octanoic acid; 2,2,2-trimethylol acetic acid, tartaric acid, and hydroxy succinic acid. The most preferred acid is 2,2-dimethylol propionic acid. Moreover, when a mixture of di- or trialkylol carboxylic acids is utilized to prepare a radiation curable resin of the invention, it is preferred that the mixture contain at least 50 percent by weight of 2,2-dimethylol propionic acid based on the total weight of the mixture. Where desired a monohydroxyl-functional carboxylic acid may be employed in the preparation of a resin of the invention. Examples of monohydroxyl-functional carboxylic acids include glycolic acid (i.e., 2-hydroxy acetic acid), lactic acid (i.e., 2-hydroxy propionic acid) and 1-hydroxy pentanoic acid. Glycolic acid and lactic acid generally are obtained in the form of aqueous solutions and for this reason are typically not utilized for preparation of preferred resins of the invention. The preferred resins of the invention typically are utilized in compositions without additional solvent or in organic solvent borne compositions.

Examples of alpha,beta-ethylenically unsaturated carboxylic acids for preparation of the resins of the invention include: acrylic acid, methacrylic acid, 2-phenyl acrylic acid, alpha-chloroacrylic acid, alpha-cyanoacrylic acid, and the like. Preferred alpha,beta-ethylenically unsaturated carboxylic acids are acrylic acid and methacrylic acid. Most preferred is acrylic acid.

In one procedure, a preferred procedure, for preparing a resin of the invention the polyfunctional hydroxyl-containing carboxylic acid, such as dimethylol propionic acid, is reacted in a first step with the organic hydroxyl-containing compound, such as a diol, in a molar ratio of dimethylol propionic acid to diol of from 3.0/1.0 to 1.0/2.0 respectively, preferably in a ratio of from 2.0/1.0 to 1.5/1.0. In this procedure the polyfunctional hydroxyl-containing carboxylic acid is reacted with the organic hydroxyl-functional compound in a temperature range of from 150 degrees C. to 220 degrees C., preferably in a temperature range of from 150 degrees C. to 210 degrees C. Typically an esterification catalyst is utilized, examples of which include butyl stannoic acid, dibutyl tin oxide, antimony oxide, dibutyl tin dilaurate, para-toluene sulfonic acid and methane sulfonic acid.

Next in a second step, the reaction product from the first step is reacted with the alpha,beta-ethylenically unsaturated carboxylic acid in a temperature range of from 90 degrees C. to 120 degrees C., preferably in a temperature range of from 95 degrees C. to 110 degrees C. The amount of reaction product from the first step and the amount of alpha-, beta-ethylenically unsaturated carboxylic acid are selected to provide a ratio of equivalents of hydroxyl groups from the reaction product of the first step to equivalents of carboxyl groups from the alpha-, beta-ethylenically unsaturated carboxylic acid ranging from 1.0/2.0 to 1.0/0.25. It is preferred to utilize an amount of reaction product from the first step and an amount of alpha,beta-ethylenically unsaturated carboxylic acid so as to provide approximately equivalent amounts of hydroxyl groups from the reaction product of the first step to carboxyl groups from the alpha,beta-ethylenically unsaturated carboxylic acid. Typically a catalyst is utilized in the second step, examples of which include methane sulfonic acid, para-toluene sulfonic acid and sulfuric acid.

Given the disclosure contained herein, it will be appreciated that a resin of the invention may be prepared utilizing other procedures such as, for example, reaction of the polyfunctional hydroxyl-containing carboxylic acid, organic hydroxyl-functional compound and alpha,beta-ethylenically unsaturated carboxylic acid together.

The resins of the invention may be utilized as the sole resin in a coating composition or in combination with other film-forming components. Preferred compositions, suitable as radiation curable coating compositions over thin films of metal deposited on nonmetallic substrates for example by vacuum deposition or sputtering, typically contain a resin of the invention in combination with a polymer having a glass transition temperature equal to or higher than minus 17 degrees C., preferably equal to or higher than 25 degrees C. Typically the polymer is selected from the group consisting of acrylic polymers, polyester polymers, and combinations thereof. Acrylic polymers are preferred, particularly acrylic polymers having a peak molecular weight of from 3,000 to 150,000 as determined by gel permeation chromatography using a polystyrene standard, and most preferably such acrylic polymers prepared utilizing isobornyl acrylate and/or isobornyl methacrylate as one of the monomers. When a composition of the invention contains both a resin of the invention and a polymer having a glass transition temperature of equal to or higher than minus 17 degrees C., the composition generally contains from 25 to 90 percent by weight of the radiation curable resin of the invention and from 10 to 75 percent by weight of the aforesaid polymer based on total resin solids in the composition.

Examples of acrylic polymers for utilization in a composition of the invention include addition polymers and copolymers of acrylic and methacrylic acids and their ester derivatives, unsaturated amides such as acrylamide and methacrylamide, and unsaturated nitriles such as acrylonitrile, methacrylonitrile and ethacrylonitrile. Additional examples of acrylic monomers which can be addition polymerized to form acrylic resins include the alkyl acrylates and the alkyl methacrylates such as methyl acrylate, ethyl acrylate, butyl acrylate, propyl acrylate, 2-ethylhexyl acrylate, methyl methacrylate, butyl methacrylate, 2-ethylhexyl methacrylate, decyl methacrylate, lauryl methacrylate, isobornyl acrylate, isobornyl methacrylate, hydroxyethyl acrylate, hydroxypropyl acrylate, hydroxyethyl methacrylate, and hydroxypropyl methacrylate. Moreover, various other unsaturated monomers can be employed in the preparation of the acrylic copolymers examples of which include: vinyl aromatic hydrocarbons such as styrene, alpha-methyl styrene, and vinyl toluene; vinyl acetate; vinyl chloride; and unsaturated epoxy-functional monomers such as glycidyl acrylate and glycidyl methacrylate.

Examples of polyester polymers for utilization in a composition of the invention include those prepared from polyhydric alcohols and polycarboxylic acids. Examples of the polyhydric alcohols and polycarboxylic acids can be found in the description of the polyester polyols supra. Also, the aforesaid substances which react in a manner similar to acids to form polyesters are also useful for preparation of the polyester polymers.

Compositions based on resins of the invention ma be cured thermally although cure by exposure to ionizing radiation or ultraviolet light is preferred. When thermal curing is employed, a free radical initiator or catalyst is utilized in the composition such as benzoyl peroxide, di-n-butyl peroxide, tertiary-butyl peracetate, dicumyl peroxide, and azobisisobutyronitrile in an amount of from 0.1 to 10 percent by weight based on the resin of the invention, and, when present, the polymer having a glass transition temperature of higher than minus 17 degrees C.

Compositions of the invention based on resins of the invention are particularly suitable for cure by exposure to ionizing radiation and/or ultraviolet light.

Ionizing radiation is radiation having an energy at least sufficient to produce ions either directly or indirectly in a medium composed of common materials such as air or water, and includes generally known ionizing particle radiation and ionizing electromagnetic radiation. Ionizing particle radiation designates the emission of electron or accelerated nuclear particles such as protons, alpha particles, dueterons, and the like. Charged particles can be accelerated using generally known devices such as resonance chamber accelerators, DC potential gradient accelerators, betatrons, synchotrons, cyclotrons and the like. Ionizing electromagnetic radiation comprises high energy photons as are present in X-rays, bremsstrahlung, gamma rays and the like. These forms of ionizing electromagnetic radiation and methods of obtaining them are generally known.

When ionizing radiation is used to cure a composition based on a resin of the invention, accelerated electrons as produced by generally known electron beam devices is preferred. When electron beam devices are used to cure a composition based on a resin of the invention, the energy of the accelerated electrons typically ranges from about 100,000 electron volts to about 300,000 electron volts. The amount of ionizing radiation in rads for curing a composition of the invention will vary depending on such factors such as the particular formulation of the radiation curable composition, thickness of the applied layer of coating composition on the substrate, temperature of the composition, and the like. However, for compositions of the invention applied at approximately room temperature, a dose of ionizing radiation ranging from about 1 megarad to about 20 megarads, typically from about 2 megarads to about 5 megarads is sufficient.

Ultraviolet radiation (UV) is the preferred form of radiation used to cure a composition of the invention based on a radiation curable resin of the invention. Any suitable source which emits ultraviolet light having a wavelength ranging from about 180 to about 400 nanometers may be employed. Because such ultraviolet light possesses insufficent energy to produce ions in a medium composed of common materials such as air or water, it is considered to be nonionizing radiation. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps usually employed to cure a composition of the invention have outputs of about 200 watts per inch across the length of the tube.

Photoinitiators, photosensitizers, or both photoinitiators and photosensitizers are often included in ultraviolet light curable compositions. These materials are generally known in the art. Examples of photosensitizers include benzophenone, anthraquinone, and thioxanthone. Examples of photoinitiators include isobutyl benzoin ether, mixtures of butyl isomers of benzyl benzoin ether, alpha,alpha-diethoxyacetophenone, and alpha,alpha-dimethoxy-alpha-penylacetophenone. Other examples of photoinitiators and photosensitizers can be found in U.S. Pat. No. 4,017,652.

In addition to a resin of the invention, a composition of the invention where desired may contain other radiation curable materials such as one or more ethylenically unsaturated monomeric, oligomeric, or polymeric compounds capable of being polymerized and/or crosslinked by irradiation with ionizing radiation and/or ultraviolet light.

Examples of polymerizable ethylenically unsaturated monomers which may be used in a composition of the invention include: acrylic or methacrylic esters such as methyl(meth)acrylate, ethyl(meth)acrylate, isopropyl(meth)acrylate, n-butyl(meth)acrylate, isobutyl(meth)acrylate, 2-ethylhexyl(meth)acrylate, 2-hydroxyethyl(meth)acrylate, glycidyl(meth)acrylate, ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, 1,2,4-butanetriol tri(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane tri(meth)acrylate, isobornyl(meth)acrylate and tetrahydrofurfuryl(meth)acrylate; acrylic or methacrylic amides such as (meth)acrylamide, diacetone(meth)acrylamide, N(beta-hydroxyethyl)-(meth)acrylamide, N,N-bis(beta-hydroxyethyl)(meth)acrylamide, methylene bis(meth)acrylamide, 1,6-hexamethylene bis(meth)acrylamide, diethylenetriamine tris(meth)acrylamide, bis(gamma-(meth)acrylamidepropoxy)ethane and beta-(meth)acrylamide ethylacrylate; and vinyl monomers such as vinyl acetate, styrene, vinyl toluene and divinyl benzene.

Examples of ethylenically unsaturated oligomers and polymers which may be employed in a composition of the invention include generally known ethylenically unsaturated polyesters, ethylenically unsaturated polyurethanes, ethylenically unsaturated acrylics, and ethylenically unsaturated epoxy resins. The ethylenically unsaturated polyesters ordinarily are esterification products of ethylenically unsaturated polycarboxylic acids and polyhydric alcohols. Usually the ethylenic unsaturation is in the alpha,beta position with respect to the carbonyl groups. The ethylenically unsaturated polyurethanes may be prepared, for example, by reacting polyols such as polyester polyols, polyether polyols, acryl polyols, epoxypolyols or polyurethane polyols with polyisocyanates containing ethylenic unsaturation; by reacting the isocyanate groups of polyurethane resins with unsaturated compounds having active hydrogen atoms such as polymerizable unsaturated carboxylic acids, alcohols, or amines; by reacting hydroxyl groups of polyurethane polyols with unsaturated carboxylic acids or anhydrides thereof; and by reacting carboxyl groups of polyurethane resins with ethylenically unsaturated epoxides. The ethylenically unsaturated acrylics may be prepared, for example, by reacting hydroxyl groups present in side chains of acrylic polymers with unsaturated mono- or polycarboxylic acids (or anhydrides) or with ethylenically unsaturated epoxides; or by reacting carboxyl groups present in side chains of acrylic polymers with ethylenically unsaturated epoxides. The ethylenically unsaturated epoxy resins may be prepared, for example, by reacting polyepoxides with unsaturated carboxylic acids or anhydrides.

Compositions based on resins of the invention may be applied to the substrate by any known means, for example, brushing, dipping, roll coating, doctor blade coating, spraying, curtain coating, etc. They may be preliminarily dried to remove solvent if desired and then cured either thermally or by radiation. Cure time will vary depending upon the particular formulation, the type of radiation employed, the amount of composition applied to the substrate and other factors, known in the art.

It has been found that compositions of the invention provide outstanding properties as coatings over thin films of metal, such as aluminum, nickel, copper, chromium, chromium alloys, etc., which have been applied to nonmetallic substrates such as plastics, examples of which include acrylonitrile-butadiene-styrene copolymers (ABS plastics), acrylics, polystyrenes, polycarbonates, polyethylenes, polypropylenes, and the like. The thin film of metal may be deposited by any of the generally known techniques such as vaccuum metallizing, sputtering, electroless deposition, and electroplating. Preferred techniques include vacuum metallizing and sputtering. Typically the process generally includes the steps of application of a basecoat to the nonmetallic substrate, applying the thin film of metal over the basecoat, and thereafter applying a topcoat. As used herein the phrase, "thin film of metal" is intended to include metal films having a thickness of from 0.2 millimicrons (0.2 nanometers, 2 angstroms) to 5,000 millimicrons (5,000 nanometers, 50,000 angstroms). It has been found that compositions of the present invention can provide an outstanding combination of properties as topcoats over metallized substrates. Examples of these properties include a high degree of adherence to the metallized substrate, good mar resistance, and outstanding resistance to degradation by various solvents including both organic solvents and water as well as various substances in, for examples, perfumes which tend to aggressively attack coatings.

The examples which follow are submitted for the purpose of further illustrating the nature of the invention and should not be construed as a limitation on the scope thereof.

As used in the body of the specification, examples, and claims, all percents, ratios and parts are by weight unless otherwise specifically indicated. Whenever used herein, "pbw" means "parts by weight".

EXAMPLE 1

This example illustrates the preparation of a resin of the invention, a composition of the invention, and application and curing of the composition on an aluminum substrate.

(a) A reaction vessel equipped with condenser, stirrer, thermometer, distillation column, and means for maintaining a nitrogen sparge is charged at ambient temperature with 1,072 grams (g, 8 moles) of dimethylolpropionic acid, 424 g (4 moles) of diethylene glycol, and 1.5 g of butyl stannoic acid. The contents of the vessel are then slowly heated to a temperature of 158 degrees Celsius (condenser head temperature of 74 degrees Celsius, C) at which temperature distillate (containing water) is observed to be distilling off. Heating is continued while the temperature of the contents of the vessel ranges between 158 degrees C. and 207 degrees C. until a total of 166 milliliters (ml) of distillate has been collected at which point heating is discontinued and the contents of the vessel allowed to cool to ambient temperature.

The resulting product has an acid value of 0.4 and a hydroxyl value of 569.6. A mixture of 60 percent by weight of the resulting product in ethylene glycol monoethyl ether (available as CELLOSOLVE from Union Carbide Corp.) has a Gardner Holdt bubble tube viscosity at room temperature of between E and F.

(b) A reaction vessel equipped with condenser, stirrer, thermometer, and distillation column are charged at ambient temperature with 295.5 g (i.e. 3.0 equivalents) of the resulting product of part (a) immediately above, 226.8 g (3.15 moles) of acrylic acid, 7.5 of a 70 percent by weight solution of methane sulfonic acid in water, 5.2 g of a 50 percent by weight solution of hypophosphorous acid in water, 2.27 g of 2,6-tertiarybutyl peracresol, 0.10 g of phenothiazine, 125 g of toluene, and 60 g of cyclohexane. The contents of the vessel are heated to a temperature of 93 degrees C. at which temperature 6 ml of distillate (containing water) is observed in the collection vessel for the distillate. Heating is continued while the contents of the vessel are refluxed and maintained in a temperature range of from 93 to 103 degrees C. until a total of 52 ml of distillate has been collected at which point heating is discontinued and the contents of the vessel allowed to cool overnight to ambient temperature. Thereafter, the contents of the vessel (still equipped as above) are heated to a temperature of 111 degrees C. at which temperature 25 g of cyclohexane is added to the contents of the vessel to lower the reflux temperature. Heating is continued while the contents of the vessel are maintained at 102 degrees C. until a total of 54 ml of distillate (i.e., including the 52 ml referred to above) has been collected at which point heating is discontinued and the contents of the vessel allowed to cool to ambient temperature. To 471 g of the resulting product is added 261 g of toluene to give a composition having a total theoretical solids content of 50 percent by weight. To this composition is added 70 g of a 20 percent by weight solution of sodium hydroxide in water to form an emulsion which immediately separated into a top organic layer and a bottom aqueous layer. The bottom aqueous layer is discarded. The top organic layer is filtered through No. 3 filter paper and a fine grade of diatomaceous earth (available as HYFLO from John-Manville Corp.). To the filtrate is added 0.47 g of hydroquinone monomethylether (available as Eastman HOMME from Eastman Kodak) followed by the addition of 50 ml of methanol. Next the filtrate is stripped under reduced pressure leaving a pale yellow product having an acid value of 13.1, a Gardner-Holdt viscosity of between W and X, a hydroxyl value of 57.8, and an unsaturation equivalent of 219.6.

(c) The formulation of a coating composition containing a resin of the invention is as set forth in the following TABLE 1.

TABLE 1

| Component | Amount (grams) |
|---|---|
| Acrylic copolymer[1] | 23.5 |
| Product resin of part (b) above | 20 |
| Bisphenol-A diglycidylether diacrylate[2] | 5 |
| Methylethyl ketone | 27 |
| Diethoxyacetophenone | 1 |
| Benzophenone | 1 |

[1]A copolymer prepared from 85 percent by weight 2-ethylhexyl acrylate and 15 percent by weight acrylic acid at 58.9 percent by weight solids in ethyl acetate having a weight average molecular weight of 168,123 and a peak molecular weight of 95,956 as determined by gel permeation chromatography using a polystyrene standard.
[2]Available as CELRAD 3700 from Celanese Corporation.

A sample of the coating composition as set forth in TABLE 1 above is drawn down using a No. 012 wire wound bar on a piece of aluminum coil coating stock, allowed to air dry for 15 minutes, and irradiated in air with ultraviolet light by twice passing the coated sample at a rate of 60 feet per minute beneath 4 medium pressure mercury vapor lamps each operating at 200 watts per inch at a distance of about 4 inches from the surface of the coated sample. The resulting cured coating is scribed with a razor blade in the form of an X. No. 610 tape from 3M Corporation is firmly pressed across the scribed area and then quickly ripped from the coating. The cured coating exhibits 0 percent failure in this test (i.e., none of the coating in the scribed area under the tape lifts from the substrate).

(d) The formulation of a coating composition containing a resin of the invention is as set forth in the following TABLE 2.

TABLE 2

| Component | Amount (grams) |
|---|---|
| Acrylic copolymer[1] | 23.5 |
| Product resin of part (b) above | 20 |
| Bisphenol-A diglycidylether diacrylate[2] | 5 |
| Methylethyl ketone | 27 |
| Diethoxyacetophenone | 1 |
| Benzophenone | 1 |

[1]A copolymer prepared from 50 percent by weight methylmethacrylate, 30 percent by weight isobornylmethacrylate and 20 percent by weight (2-phenoxy) ethyl acrylate (also known as phenyl Cellosolve acrylate) at 53.4 percent by weight solids in a mixture of 4 parts by weight of ethyl acetate to 1 part by weight of toluene, and having a Gardner-Holdt viscosity of between Z-3 and Z-4, a weight average molecular weight of 167,003 and a peak molecular weight of 94,784 as determined by gel permeation chromatography using a polystyrene standard.
[2]Available as CELRAD 3700 from Celanese Corporation.

A sample of the coating composition as set forth in TABLE 2 above is drawn down using a No. 012 wire wound bar on a piece of aluminum coil coating stock, allowed to air dry for 15 minutes, and irradiated in air with ultraviolet light by twice passing the coated sample at a rate of 60 feet per minute beneath 4 medium pressure mercury vapor lamps each operating at B 200 watts per inch at a distance of about 4 inches from the surface of the coated sample. The resulting cured coating is scribed with a razor blade in the form of an X. No. 610 tape from 3M Corporation is firmly pressed across the scribed area and then quickly ripped from the coating. The cured coating exhibits 0 percent failure in this test (i.e., none of the coating in the scribed area under the tape lifts from the substrate).

EXAMPLE 2

This example illustrates the preparation of a resin of the invention, a composition of the invention, and application and curing of the composition to a highly adherent film on a plastic substrate vacuum metallized with a thin film of aluminum.

(a) A reaction vessel equipped with condenser, stirrer, thermometer, distillation column, and means for maintaining a nitrogen sparge is charged at ambient temperature with 1,072 grams (g, 8 moles) of dimethylolpropionic acid, 424 g (4 moles) of diethylene glycol, and 1.5 g of butyl stannoic acid. The contents of the vessel are then slowly heated to a temperature of 158 degrees Celsius (condenser head temperature of 74 degrees Celsius, C.) at which temperature distillate (containing water) is observed to be distilling off. Heating is continued while the temperature of the contents of the vessel ranges between 158 degrees C. and 207 degrees C. until a total of 166 milliliters (ml) of distillate has been collected at which point heating is discontinued and the contents of the vessel allowed to cool to ambient temperature.

The resulting product has an acid value of 0.4 and a hydroxyl value of 569.6. A mixture of 60 percent by weight of the resulting product in ethylene glycol monoethyl ether (available as CELLOSOLVE from Union Carbide Corp.) has a Gardner Holdt bubble tube viscosity at room temperature of between E and F.

(b) A reaction vessel equipped with condenser, stirrer, thermometer, and distillation column are charged at ambient temperature with 689.4 g (i.e. 7.0 equivalents) of the resulting product of part (a) immediately above, 529.2 g (7.35 moles) of acrylic acid, 17.4 g of a 70 percent by weight solution of methane sulfonic acid in water, 12.2 g of a 50 percent by weight solution of hypophosphorous acid in water, 5.3 g of 2,6-tertiarybutyl peracresol, 0.24 g of phenothiazine, 275 g of toluene, and 100 g of cyclohexane. The contents of the vessel are heated to a temperature of 94 degrees C. at which temperature 2 ml of distillate (containing water) is observed in the collection vessel for the distillate. Heating is continued while the contents of the vessel are refluxed and maintained in a temperature range of from 94 to 104 degrees C. until a total of 120 ml of distillate has been collected at which point heating is discontinued and the contents of the vessel allowed to cool overnight to ambient temperature. Thereafter, the contents of the vessel (still equipped as above) are heated to a temperature of 105 degrees C. at which temperature an additional 5 ml of distillate is collected. Heating is continued while the contents of the vessel are refluxed and maintained in a temperature range of from 105 to 106 degrees C. until a total of 132 ml of distillate (i.e., including the distillate referred to above) has been collected at which point heating is discontinued and the contents of the vessel allowed to cool to ambient temperature. To 1,495 g of the resulting product is added 712 g of toluene to give a composition having a total theoretical solids content of 50 percent by weight. To this composition is added 155 g of a 20 percent by weight solution of sodium hydroxide in water to form a light emulsion which upon standing overnight separated into a top organic layer and a bottom aqueous layer. The bottom aqueous layer is discarded. The top organic layer is filtered through No. 2 filter paper. With the filtrate, which is cloudy, is admixed 80 g of sodium sulfate, and the mixture is filtered through No. 3 filter paper resulting in a clear filtrate. To the clear filtrate is added 1.1 g of hydroquinone monomethylether (available as Eastman HQMME from Eastman Kodak) following by the addition of 75 ml of methanol. Next the filtrate is stripped under reduced pressure leaving 1,071.9 g of product resin having an acid value of 6.5, a Gardner-Holdt viscosity of between X and Y, a hydroxyl value of 11.1, and an unsaturation equivalent of 168. Analysis using gas chromatography showed the product to have a residual toluene content of 3.7 percent by weight of the product.

(c) The formulation of a coating composition containing a resin of the invention is as set forth in the following TABLE 3.

TABLE 3

| Component | Amount (grams) |
|---|---|
| Acrylic copolymer[1] | 945.2 |
| Product resin of part (b) above | 804.4 |
| Bisphenol-A diglycidylether diacrylate[2] | 201.1 |
| Methylethyl ketone | 1086 |
| Diethoxyacetophenone | 40.2 |

TABLE 3-continued

| Component | Amount (grams) |
|---|---|
| Benzophenone | 40.2 |

[1] A copolymer prepared from 50 percent by weight methylmethacrylate, 30 percent by weight isobornylmethacrylate and 20 percent by weight (2-phenoxy) ethyl acrylate (also known as phenyl Cellosolve acrylate) at 56.8 percent by weight solids in a mixture of 4 parts by weight of ethyl acetate to 1 part by weight of toluene, and having a Gardner-Holdt viscosity of between Z-3 and Z-4, a weight average molecular weight of 190,294 and a peak molecular weight of 102,617 as determined by gel permeation chromatography using a polystyrene standard.
[2] Available as CELRAD 3700 from Celanese Corporation.

The Brookfield viscosity (Model RV-T; No. 2 spindle, 77 degrees Fahrenheit, 25 degrees C.) of the composition of TABLE 3 is determined at 100 rpm (revolutions per minute), 50 rpm and 20 rpm to be respectively 92 centipoises (cps), 68.8 cps and 56 cps giving an average Brookfield viscosity of 72.3 cps. (d) Two samples of the composition of TABLE 3 above are applied using No. 010 and No. 016 wire wound bars respectively, to separate panels of ABS (acrylonitrile-butadiene-styrene) plastic which had been vacuum metallized with a thin film of aluminum. One half of each of the vacuum metallized panels is rubbed with a cloth dipped in methyl ethyl ketone before application of the composition to both halves of each panel. The resulting coatings on the panels are cured by irradiation in air with ultraviolet light by twice passing each of the coated panels at a rate of 60 feet per minute beneath 4 medium pressure mercury vapor lamps each operating at 200 watts per inch at a distance of about 4 inches from the surface of the coated panel.

The resulting cured coatings are scribed with a razor blade in the form of an X. No. 600 tape from 3M Corporation is firmly pressed across the scribed areas and then quickly ripped from the coatings. The cured coatings exhibits 0 percent failure in this test (i.e., none of the coating in the scribed area under the tape lifts from the panel either in the area rubbed with methyl ethyl ketone or in the area not so rubbed).

EXAMPLE 3

This example illustrates the preparation of a resin of the invention utilized in a composition of Example 7 below.

(a) A reaction vessel equipped with condenser, stirrer, thermometer, distillation column, and means for maintaining a nitrogen sparge is charged at ambient temperature with 1,072 g (8 moles) of dimethylolpropionic acid, 360.0 g (4 moles) of 1,4-butanediol, and 1.4 g of butyl stannoic acid. The contents of the vessel are then slowly heated to a temperature of 160 degrees Celsius (condenser head temperature of 75 degrees Celsius, C.) at which temperature distillate (containing water) is observed to be distilling off. Heating is continued while the temperature of the contents of the vessel ranges between 160 degrees C. and 207 degrees C. until a total of 205 ml of distillate has been collected at which point heating is discontinued and the contents of the vessel allowed to cool to ambient temperature.

The resulting product has an acid value of 1.3 and a hydroxyl value of 600.3. A mixture of 60 percent by weight of the resulting product in propylene glycol monomethyl ether (DOWANOL PM) has a Gardner Holdt bubble tube viscosity at room temperature of about I.

(b) A reaction vessel equipped with condenser, stirrer, thermometer, and distillation column are charged at ambient temperature with 327.0 g (i.e. 3.5 equivalents)

of the resulting product of part (a) immediately above, 264.6 g (3.675 moles) of acrylic acid, 8.5 g of a 70 percent by weight solution of methane sulfonic acid in water, 5.9 g of a 50 percent by weight solution of hypophosphorous acid in water, 2.6 g of 2,6-tertiarybutyl paracresol, 0.12 g of phenothiazine, 100 g of toluene, and 50 g of cyclohexane. The contents of the vessel are slowly heated to a temperature of 93 degrees C. at which temperature refluxing is observed. The contents of the vessel are allowed to reflux for 3 hours and 41 minutes in a temperature range of from 93 to 104 degrees C. at the end of which period 58 ml of distillate (containing water) is observed in the collection vessel for the distillate. Next, heating is discontinued, and the contents of the vessel are allowed to cool overnight to ambient temperature. Thereafter, the contents of the vessel (still equipped as above) are heated to a temperature of 117 degrees C. at which temperature refluxing is observed and at which temperature 20 g of cyclohexane is added to the contents of the vessel to lower the reflux temperature. The contents of the vessel are allowed to reflux for 5 hours in a temperature range of from 117 to 125 degrees C. until a total of 68 ml of distillate (i.e., including the 58 ml referred to above) has been collected at which point heating is discontinued and the contents of the vessel allowed to cool to ambient temperature. To 684 g of the resulting product is added 353 g of toluene to give a composition having a total theoretical solids content of 50 percent by weight. To this composition is added 75.9 g of a 20 percent by weight solution of sodium hydroxide in water to form an emulsion which separates into a cloudy top organic layer and a bottom aqueous layer. The bottom aqueous layer is discarded. The top organic layer is filtered through No. 3 filter paper. To the resulting filtrate is added about 100 g of sodium sulfate, and the filtrate is allowed to stand for 4 hours over which period the filtrate is occasionally stirred. The composition is again filtered (this time using No. 2 filter paper), and the resulting filtrate is clear. To the clear filtrate is added 0.1 percent by weight of hydroquinone monomethylether (available as Eastman HQMME from Eastman Kodak) followed by the addition of 50 ml of methanol. Next the filtrate is stripped under reduced pressure leaving a product resin having an acid value of 14.6, a Gardner-Holdt viscosity of Z-5, a hydroxyl value of 53.8, an unsaturation equivalent of 157, a weight average molecular weight of 1,784 and a peak molecular weight of 1,034 both determined by gel permeation chromatography using a polystyrene standard.

EXAMPLE 4

This example illustrates the preparation of a resin of the invention utilized in a composition of Example 8 below.

(a) A reaction vessel equipped with condenser, stirrer, thermometer, distillation column, and means for maintaining a nitrogen sparge is charged at ambient temperature with 1,072 g (8 moles) of dimethylolpropionic acid, 576 g (4 moles) of cyclohexanedimethanol, and 1.6 g of butyl stannoic acid. The contents of the vessel are then slowly heated to a temperature of 158 degrees Celsius (condenser head temperature of 98 degrees Celsius, C.) at which temperature distillate (containing water) is observed to be distilling off. Heating is continued while the temperature of the contents of the vessel ranges between 158 degrees C. and 212 degrees C. until a total of 144 ml of distillate has been collected at which point heating is discontinued and the contents of the vessel allowed to cool to ambient temperature.

The resulting product has a hydroxyl value of 570. A mixture of 60 percent by weight of the resulting product in propylene glycol monomethyl ether (DOWANOL PM) has a Gardner Holdt bubble tube viscosity at room temperature of J.

(b) A reaction vessel equipped with condenser, stirrer, thermometer, and distillation column are charged at ambient temperature with 360.3 g (i.e., 3.6 equivalents) of the resulting product of part (a) immediately above, 264.6 g (3.675 moles) of acrylic acid, 8.9 g of a 70 percent by weight solution of methane sulfonic acid in water, 6.3 g of a 50 percent by weight solution of hypophosphorous acid in water, 2.6 g of 2,6-tertiarybutyl paracresol, 0.13 g of phenothiazine, 100 g of toluene, and 50 g of cyclohexane. The contents of the vessel are slowly heated to a temperature of 92 degrees C. at which temperature refluxing is observed. The contents of the vessel are allowed to reflux for 4 hours in a temperature range of from 92 to 95 degrees C. at the end of which period 60 ml of distillate (containing water) is observed in the collection vessel for the distillate. Next, heating is discontinued and the contents of the vessel are allowed to cool overnight to ambient temperature. Thereafter, the contents of the vessel (still equipped as above) are heated to a temperature of 104 degrees C. at which temperature refluxing is observed. The contents of the vessel are allowed to reflux for 3 hours and 46 minutes in a temperature range of from 104 to 112 degrees C. until a total of 69 ml of distillate (i.e., including the 60 ml referred to above) has been collected (and the contents of the reaction vessel have an acid value of 26.9) at which point heating is discontinued and the contents of the vessel allowed to cool to ambient temperature. To 723 g of the resulting product is added about 410 g of toluene to give a composition having a total theoretical solids content of 50 percent by weight. To this composition is added 75.9 g of a 20 percent by weight solution of sodium hydroxide in water to form an emulsion which immediately separates into a top organic layer which clears on standing overnight and a bottom aqueous layer. The bottom aqueous layer is discarded. The clear, top organic layer is filtered through No. 2 filter paper. To the resulting clear, pale yellow filtrate is added 0.1 percent by weight of hydroquinone monomethylether (available as Eastman HQMME from Eastman Kodak) followed by the addition of 50 ml of methanol. Next the filtrate is stripped under reduced pressure leaving 535.9 g of a product resin having an acid value of 5.6, a Gardner-Holdt viscosity of Z-5⁻, a hydroxyl value of 50.2, an unsaturation equivalent of 174, a weight average molecular weight of 1,059 and a peak molecular weight of 522 both determined by gel permeation chromatography using a polystyrene standard.

EXAMPLE 5

This example illustrates the preparation of a resin of the invention utilized in a composition of Example 9 below.

(a) A reaction vessel equipped with condenser, stirrer, thermometer, distillation column, and means for maintaining a nitrogen sparge is charged at ambient temperature with 1,072 g (8 moles) of dimethylolpropionic acid, 536 g (4 moles) of dipropyleneglycol, and 1.6 g of butyl stannoic acid. The contents of the vessel are then slowly heated to a temperature of 175 degrees Celsius (condenser head temperature of 88 degrees Celsius, C.) at which temperature distillate (containing water) is observed to be distilling off. Heating is continued while the temperature of the contents of the vessel ranges between 175 degrees C. and 206 degrees C. until an acid value of 0.4 (measured at ambient temperature) for the contents of the vessel is obtained at which point heating is discontinued and the contents of the vessel allowed to cool to ambient temperature.

The resulting product has an acid value of 0.4 and a hydroxyl value of 547.4. A mixture of 60 percent by weight of the resulting product in propylene glycol monomethyl ether (DOWANOL PM) has a Gardner Holdt bubble tube viscosity at room temperature of H.

(b) A reaction vessel equipped with condenser, stirrer, thermometer, and distillation column are charged at ambient temperature with 358.7 g (i.e., 3.5 equivalents) of the resulting product of part (a) immediately above, 264.6 g (3.675 moles) of acrylic acid, 8.9 g of a 70 percent by weight solution of methane sulfonic acid in water, 6.2 g of a 50 percent by weight solution of hypophosphorous acid in water, 2.6 g of 2,6-tertiarybutyl paracresol, 0.13 g of phenothiazine, 100 g of toluene, and 50 g of cyclohexane. The contents of the vessel are slowly heated to a temperature of 100 degrees C. at which temperature 40 g of cyclohexane is added and refluxing is observed. The contents of the vessel are allowed to reflux for 4 hours and 15 minutes in a temperature range of from 100 to 115 degrees C. at the end of which period an unmeasured amount of distillate (containing water) is observed in the collection vessel for the distillate. Next, heating is discontinued and the contents of the vessel are allowed to cool overnight to ambient temperature. Thereafter, the contents of the vessel (still equipped as above) are heated to a temperature of 107 degrees C. at which temperature refluxing is observed. The contents of the vessel are allowed to reflux for 54 minutes in a temperature range of from 107 to 110 degrees C. until a total of 61 ml of distillate (i.e., including the unmeasured amount referred to above) has been collected (and the contents of the reaction vessel has an acid value of 10.1) at which point heating is discontinued and the contents of the vessel allowed to cool to ambient temperature. To 685 g of the resulting product is added 405 g of toluene to give a composition having a total theoretical solids content of about 50 percent by weight. To this composition is added 132 g of a 20 percent by weight solution of sodium hydroxide in water to form a semi-emulsion which quickly separates into a dark, cloudy, top organic layer and a bottom aqueous layer. The bottom aqueous layer is discarded. The top organic layer is filtered through No. 1 filter paper. To the resulting dark, clear filtrate is added 0.1 percent by weight of hydroquinone monomethylether (available as Eastman HQMME from Eastman Kodak) followed by the addition of 50 ml of methanol. Next the filtrate is stripped under reduced pressure leaving 533.9 g of a product resin having an acid value of 10.3, a Gardner-Holdt viscosity of Z-2−, a hydroxyl value of 55.3, an unsaturation equivalent of 171, a weight average molecular weight of 1,251 and a peak molecular weight of 972 both determined by gel permeation chromatography using a polystyrene standard.

EXAMPLES 6 THROUGH 9

Examples 6 through 9 illustrate compositions of the invention, application and curing of the compositions on a vacuum metallized ABS (acrylonitrile-butadiene-styrene copolymer) substrate, and properties of the resulting cured films.

(a) The formulations of coating compositions containing resins of the invention are as set forth in the following TABLE 4.

TABLE 4

| Component Example | Amount (pbw) | | | |
|---|---|---|---|---|
| | 6 | 7 | 8 | 9 |
| Methylamyl ketone | 20.83 | 20.83 | 20.83 | 20.83 |
| Benzophenone | 0.78 | 0.78 | 0.78 | 0.78 |
| Bisphenol-A diglycidylether diacrylate[1] | 3.83 | 3.83 | 3.83 | 3.83 |
| Product resin similar to that of Example 1(b) above | 15.67 | 0 | 0 | 0 |
| Product resin of Example 3(b) above | 0 | 15.67 | 0 | 0 |
| Product resin of Example 4(b) above | 0 | 0 | 15.67 | 0 |
| Product resin of Example 5(b) above | 0 | 0 | 0 | 15.67 |
| Acrylic copolymer[2] | 25.75 | 25.75 | 25.75 | 25.75 |
| Diethoxyacetophenone | 0.78 | 0.78 | 0.78 | 0.78 |
| Butyl acetate | 32.36 | 32.36 | 32.36 | 32.36 |

[1] Available as CELRAD 3700 from Celanese Corporation.
[2] A copolymer prepared from 70 percent by weight methylmethacrylate, 20 percent by weight isobornyl methacrylate, 5 percent by weight methacrylic acid and 5 percent by weight 2-hydroxyethyl acrylate at 46.7 percent by weight solids in a mixture of 3 parts by weight of butyl acetate to 1 part by weight of toluene, and having an acid value of 15, a Brookfield viscosity (RVT Model, No. 7 spindle, 10 revolutions/minute, 77 degrees F., 25 degrees C.) of 109,920 centipoises, a weight average molecular weight of 110,551 and a peak molecular weight of 100,458 as determined by gel permeation chromatography using a polystyrene standard.

Samples of coating compositions 6 through 9 respectively as set forth in TABLE 4 above are drawn down using a No. 024 wire-wound bar on about a 2 inch by 2 inch square (2.5 centimeter by 2.5 centimeter) flat side of each of three ABS (acrylonitrile-butadiene-styrene copolymer) perfume caps having thereon a thin film of vacuum deposited aluminum over a conventional basecoat. (That is, the coating compositions are applied directly to the thin film of metal which has been vacuum deposited over the conventional basecoat adhered to the ABS substrate.) Just prior to application of the coating compositions to the vacuum metallized caps, the vacuum metallized caps are "glowed" for about a minute in a laboratory scale vacuum metallizing chamber to clean the metallized surface. As used in the preceding sentence "glowed" means that the vacuum metallized caps are placed in a laboratory scale vacuum metallizing chamber containing air at reduced pressure which air is ionized (and glows) from the discharge from a metal rod at the bottom of the chamber.

Just after application of the coating compositions to the flat side of the vacuum metallized caps, the resultant wet coatings are dried for 2 minutes at 140 degrees F. (60.0 degrees C.) and then cured by irradiation in air with ultraviolet light by passing the coated samples (coating side up) at a rate of 40 feet per minute beneath 2 medium pressure mercury vapor lamps each operating at 200 watts per inch at a distance of 3 inches from the surface of the coating.

Four of the resultant cured coatings on the caps (one each prepared from compositions 6 through 9 above) are scribed in the form of an X approximately down to the ABS substrate. Frosty tape from 3M Corporation is firmly pressed across the scribed area and then quickly ripped from the coating. The coatings from Examples 6, 7 and 9 exhibit 0 percent failure in this test, and the coating from Example 8 exhibits only 10 percent failure in this test. As used in the preceding sentence, "0 percent failure" means that none of the coating in the scribed area under the tape lifts from the substrate in this test. Following this test for adhesion, the four caps, having thereon the scribed coatings, are subjected to soaking in perfume (Isle of Gardinia) for 24 hours after which they are rinsed with water and allowed to dry. Thereafter, Frosty tape from 3M Corporation is again firmly pressed across the scribed area and then quickly ripped from the coating. The coatings from each of Examples 6, 7 and 9 show no failure in this test, and the coating from Example 8 shows no additional failure in this test.

Four of the resultant cured coatings on the caps (one each prepared from compositions 6 through 9 above) each scribed in the form of an X are exposed for 24 days in a humidity chamber to 100 percent relative humidity at 98 to 100 degrees F. (37 to 38 degrees C.). At the end of the 24-day period, none of the coatings exhibits evidence of deterioration under the scribed area. Moreover, none of the coatings when tested for adhesion employing Frosty tape from 3M Corporation in the manner described in the above paragraph, after the 24-day period in the humidity chamber, exhibits evidence of adhesion failure.

Four of the resultant cured coatings on the caps (one each prepared from compositions 6 through 9) are exposed for 18 days in a salt spray chamber to salt spray (from a solution of 5 percent by weight sodium chloride in water) at 100 percent relative humidity at 92 to 97 degrees F. (33 to 36 degrees C.). At the end of the 18-day period the area beneath the coatings shows no evidence of deterioration whereas the aluminum film in the uncoated area of the caps is almost gone. Thereafter, the caps are returned to the salt spray chamber (operating at the same conditions) for an additional 31-day period thereby bringing the total time in the chamber to 49 days. At the end of this 49-day period the cured coatings on the caps are removed from the salt spray chamber and again examined visually for deterioration. None of the coatings exhibits evidence of deterioration after this 49-day period (i.e., the metallized area under the coatings is still intact and has remained shiny).

What is claimed is:

1. A nonaqueous, ungelled radiation curable resin which is an ester prepared by reacting components consisting essentially of:
   (a) a di- or trialkylol carboxylic acid having a molecular weight less than or equal to 1,000 or a mixture thereof; with
   (b) an organic hydroxyl-functional compound selected from the group consisting of (i) simple diols, triols, and higher hydric alcohols, (ii) polyester polyols having a peak molecular weight of less than or equal to 1,000 as determined by gel permeation chromatography using a polystyrene standard, (iii) polyether polyols having a peak molecular weight of less than or equal to 1100 determined by gel permeation chromatography using a polystyrene standard and (iv) a combination thereof; and
   (c) an alpha,beta-ethylenically unsaturated carboxylic acid wherein carboxyl functionality of said di- or trialkylol carboxylic acid is reacted with hydroxyl functionality of said hydroxyl-functional compound, and wherein carboxyl functionality of said alpha,beta-ethylenically unsaturated carboxylic acid is reacted with hydroxyl functionality from said organic hydroxyl-functional compound and/or from said di- or trialkylol carboxylic acid.

2. The radiation curable resin of claim 1 wherein said di- or trialkylol carboxylic acid comprises at least 50 percent by weight of dimethylol propionic acid.

3. The radiation curable resin of claim 2 wherein said organic hydroxyl-functional compound is essentially free of carboxyl functionality.

4. The radiation curable resin of claim 2 having a double bond equivalent weight of from 100 to 1,000.

5. The radiation curable resin of claim 4 having a peak molecular weight of from 256 to 2,000 as determined by gel permeation chromatography using a polystyrene standard.

6. The radiation curable resin of claim 4 wherein said alpha,beta-ethylenically unsaturated carboxylic acid is selected from the group consisting of acrylic acid, methacrylic acid and a mixture thereof.

7. The radiation curable resin of claim 4 wherein said organic hydroxyl-functional compound has a hydroxyl functionality of at least 2.

8. The radiation curable resin of claim 4 wherein said reaction product has an acid value of less than or equal to 10.

9. The radiation curable resin of claim 1 prepared by first reacting said polyfunctional hydroxyl-containing carboxylic acid with said organic hydroxyl-functional compound to form a first reaction product and thereafter reacting said first reaction product with said alpha,beta ethylenically unsaturated carboxylic acid.

10. A nonaqueous radiation curable composition containing: a nonaqueous, ungelled radiation curable resin which resin is an ester prepared by reacting, components consisting essentially of:
   (a) a di- or trialkylol carboxylic acid having a molecular weight less than or equal to 1,000 or a mixture thereof; with
   (b) an organic hydroxyl-functional compound selected from the group consisting of (i) simple diols, triols, and higher hydric alcohols, (ii) polyester polyols having a peak molecular weight of less than or equal to 1,000 as determined by gel permeation chromatography using a polystyrene standard, (iii) polyether polyols having a peak molecular weight of less than or equal to 1100 determined by gel permeation chromatography using a polystyrene standard and (iv) a combination thereof; and
   (c) an alpha,beta-ethylenically unsaturated carboxylic acid wherein carboxyl functionality of said di- or trialkylol carboxylic acid is reacted with hydroxyl functionality of said hydroxyl-functional compound, and wherein carboxyl functionality of said alpha,beta-ethylenically unsaturated carboxylic acid is reacted with hydroxyl functionality from said organic hydroxyl-functional compound and/or from said di- or trialkylol carboxylic acid.

11. The radiation curable composition of claim 10 further containing a polymer having a glass transition temperature equal to or higher than minus 17 degrees Celsius selected from the group consisting of an acrylic polymer, a polyester polymer, and a combination thereof.

12. The radiation curable composition of claim 11 wherein said di- or trialkylol carboxylic acid comprises at least 50 percent by weight of dimethylol propionic acid.

13. The radiation curable composition of claim 12 wherein said radiation curable resin has a double bond equivalent weight of from 100 to 1,000.

14. The radiation curable composition of claim 12 wherein said radiation curable resin has a peak molecular weight of from 256 to 2,000 as determined by gel permeation chromatography using a polystyrene standard.

15. The radiation curable composition of claim 12 wherein said polymer is an acrylic polymer having a peak molecular weight of from 3,000 to 150,000.

16. The radiation curable composition of claim 15 wherein said acrylic polymer is a copolymer of monomers, at least one of which is selected from the group consisting of isobornyl acrylate, isobornyl methacrylate, and a combination thereof.

17. The radiation curable composition of claim 13 wherein said organic hydroxyl-functional compound has a hydroxyl functionality of at least 2, said alpha,-beta-ethylenically unsaturated carboxylic acid is selected from the group consisting of acrylic acid, methacrylic acid and a mixture thereof, and said radiation curable resin has a peak molecular weight of from 256 to 2,000 as determined by gel permeation chromatography using a polystyrene standard, and said reaction product has an acid value of less than or equal to 10.

18. The radiation curable composition of claim 12 containing from 25 to 90 percent by weight of said radiation curable resin and from 10 to 75 percent by weight of said polymer having a glass transition temperature equal to or higher than a minus 17 degrees Celsius, based on total resin solids in said composition.

19. The radiation curable composition of claim 18 wherein said acrylic polymer is a copolymer of monomers at least one of which is selected from the group consisting of isobornyl acrylate, isobornyl methacrylate, and a combination thereof.

20. The radiation curable composition of claim 18 wherein said organic hydroxyl-functional compound has a hydroxyl functionality of at least 2, said alpha,-beta-ethylenically unsaturated carboxylic acid is selected from the group consisting of acrylic acid, methacrylic acid and a mixture thereof, and said radiation curable resin has a double bond equivalent weight of from 100 to 1,000 and a peak molecular weight of from 256 to 2,000 as determined by gel permeation chromatography using a polystyrene standard, and said reaction product has an acid value of less than or equal to 10.

21. A non-metallic substrate having thereon an adherent, layer of metal, said layer of metal coated with a nonaqueous radiation cured coating composition containing: a nonaqueous, ungelled radiation curable resin which is an ester prepared by reacting, components consisting essentially of:

(a) a di- or trialkylol carboxylic acid having a molecular weight less than or equal to 1,000 or a mixture thereof; with (b) an organic hydroxyl-functional compound selected from the group consisting of (i) simple diols, triols, and higher hydric alcohols, (ii) polyester polyols having a peak molecular weight of less than or equal to 1,000 as determined by gel permeation chromatography using a polystyrene standard, (iii) polyether polyols having a peak molecular weight of less than or equal to 1100 determined by gel permeation chromatography using a polystyrene standard and (iv) a combination thereof; and (c) an alpha,beta-ethylenically unsaturated carboxylic acid wherein carboxyl functionality of said di- or trialkylol carboxylic acid is reacted with hydroxyl functionality of said hydroxyl-functional compound, and wherein carboxyl functionality of said alpha,beta-ethylenically unsaturated carboxylic acid is reacted with hydroxyl functionality from said organic hydroxyl-functional compound and/or from said di- or trialkylol carboxylic acid.

22. The substrate of claim 21 wherein said polyfunctional hydroxyl-containing carboxylic acid is a di- or trialkylol carboxylic acid.

23. The substrate of claim 22 wherein said radiation cured coating composition additionally contains a polymer having a glass transition temperature equal to or higher than minus 17 degrees Celsius selected from the group consisting of an acrylic polymer, a polyester polymer, and a combination thereof.

24. The substrate of claim 23 wherein said radiation curable resin has a double bond equivalent weight of from 100 to 1,000 and a peak molecular weight of from 256 to 2,000 as determined by gel permeation chromatography using a polystyrene standard, and said polymer is an acrylic polymer having a peak molecular weight of from 3,000 to 150,000.

25. The substrate of claim 24 wherein said organic hydroxyl-functional compound has a hydroxyl functionality of at least 2, said alpha,beta-ethylenically unsaturated carboxylic acid is selected from the group consisting of acrylic acid, methacrylic acid and a mixture thereof, and said reaction product has an acid value of less than or equal to 10.

26. The substrate of claim 25 wherein said radiation curable composition containing from 25 to 90 percent by weight of said radiation curable resin and from 10 to 75 percent by weight of said polymer having a glass transition temperature equal to or higher than minus 17 degrees Celsius, based on total resin solids in said composition.

27. The substrate of claim 22 wherein said layer of metal is a thin film of metal.

* * * * *